(12) United States Patent
Droppleman (10) Patent No.: US 6,997,348 B2
(45) Date of Patent: Feb. 14, 2006

(54) POST VALVE HAVING A ONE PIECE VALVE BODY

(75) Inventor: J. Patrick Droppleman, Pleasant Prairie, WI (US)

(73) Assignee: Ocenco, Inc., Pleasant Prairie, WI (US)

( * ) Notice: Subject to any disclaimer, the term of this patent is extended or adjusted under 35 U.S.C. 154(b) by 0 days.

(21) Appl. No.: 10/612,634

(22) Filed: Jul. 2, 2003

(65) Prior Publication Data

US 2005/0001192 A1    Jan. 6, 2005

(51) Int. Cl.
B67D 1/00        (2006.01)

(52) U.S. Cl. .................... 222/3; 222/1; 222/189.06; 141/3; 141/18; 251/144

(58) Field of Classification Search ............... 251/144; 222/3, 198.06, 189.06, 1; 141/3, 18, 20, 141/21
See application file for complete search history.

(56) References Cited

U.S. PATENT DOCUMENTS

| | | | |
|---|---|---|---|
| 783,024 A | 2/1905 | Cox, Jr. | |
| 1,427,854 A | 9/1922 | Rogers | |
| 2,126,594 A | 8/1938 | Weatherhead, Jr. | |
| 2,446,626 A | 8/1948 | Baxter et al. | |
| 2,520,976 A | 9/1950 | Stroop | |
| 2,524,052 A | 10/1950 | Grant, Jr. | |
| 2,570,909 A * | 10/1951 | Benson et al. | 251/144 |
| 2,689,581 A * | 9/1954 | Davenport | 137/478 |
| 4,106,749 A * | 8/1978 | Behle | 251/144 |
| 4,159,744 A | 7/1979 | Monet et al. | |
| 4,363,424 A | 12/1982 | Holben et al. | |
| 5,209,456 A | 5/1993 | Chronister | |
| 5,282,493 A | 2/1994 | Schwartz et al. | |
| 5,452,738 A * | 9/1995 | Borland et al. | 137/265 |
| 6,148,841 A | 11/2000 | Davidson | |
| 6,230,737 B1 | 5/2001 | Notaro et al. | |

FOREIGN PATENT DOCUMENTS

| | | |
|---|---|---|
| DE | S 37520 A1 | 2/1954 |
| DE | 196 45 608 A1 | 7/1998 |

(Continued)

OTHER PUBLICATIONS

PCT International Search Report by the European Patent Office (Netherlands) for International Application No. PCT/US2004/022725 dated Nov. 10, 2004.

Primary Examiner—J. Casimer Jacyna
(74) Attorney, Agent, or Firm—Marshall, Gerstein & Borun LLP (57) ABSTRACT

A new and improved high pressure post valve used to control the flow of high pressure gas, e.g., oxygen, from a high pressure gas cylinder. More particularly, the improvements are directed to three different inventive embodiments: (1) manufacturing the post valve from cylindrical metal bar stock to contain a unitary valve body having an integral valve body seat ring for seating against gas cylinder structure, thereby preventing gas leakage between the valve body and the valve body seat ring; (2) providing the post valve with a valve actuator having an annular valve seat, surrounding a valve cavity, and disposing a deformable valve seat material in position to surround a gas inlet orifice for sealing contact with the annular actuator valve seat for sealing in an area surrounding the gas inlet orifice to prevent direct contact of high pressure inlet gas against the valve seat material; and (3) disposing of filter within a gas inlet orifice of the post valve to remove any solids entrained in of high pressure gas to prevent solids from contacting the valve actuator.

29 Claims, 2 Drawing Sheets

FOREIGN PATENT DOCUMENTS

* cited by examiner

POST VALVE HAVING A ONE PIECE VALVE BODY

FIELD OF THE INVENTION

The present invention is directed to a new and improved high pressure post valve used to control the flow of high pressure gas, e.g., oxygen, from a high pressure gas cylinder. More particularly, the improvements are directed to three different inventive embodiments: (1) manufacturing the post valve from cylindrical metal bar stock to contain a unitary valve body having an integral valve body seat ring for seating against gas cylinder structure, thereby preventing gas leakage between the valve body and the valve body seat ring; (2) providing the post valve with a valve actuator having an annular valve seat, surrounding a valve cavity, and disposing a deformable valve seat material in position to surround a gas inlet orifice for sealing contact with the annular actuator valve seat for sealing in an area surrounding the gas inlet orifice to prevent direct contact of high pressure inlet gas against the valve seat material; and (3) disposing a filter within a gas inlet orifice of the post valve to remove any solids entrained in the high pressure gas to prevent solids from contacting the valve actuator.

BACKGROUND

A post valve is a valve that is used to control flow of fluid, typically gas, out of a high pressure container or cylinder. Post valves are, for example, common on high pressure oxygen cylinders, and typically have a hand crank mechanism that allows a person to manually open and close the valve to enable or disable the flow of gas from the cylinder. A seat ring is disposed between the valve body and the gas cylinder and either one or two elastomeric O-rings are placed on one or both sides of the seat ring to limit gas escaping from the gas cylinder between a gas cylinder-connecting threaded extension and the gas cylinder.

During operation, the valve actuator is turned, using a handle, knob or other turning mechanism connected thereto, to open a valve orifice within the valve body to thereby allow gas to enter through a passageway within the threaded extension and to flow out of a gas cylinder outlet orifice to the valve actuator. The outlet orifice may be fluidly connected to a device that uses the gas within the gas cylinder, such as a torch or a breathing apparatus.

In prior art post valves, the seat ring is created or machined as a separate part and is placed over a collar on the threaded extension before the post valve is attached to the gas cylinder. In the past, O-rings have been placed on both sides of the seat ring, or without an O-ring between the seat ring and the valve body, and the seat ring has been press fitted onto the collar of the threaded extension. In either case, there is some opportunity for high pressure gas within the gas cylinder to escape through the threaded engagement of the extension and the inner diameter of the seat ring. Further, the manufacturing of the seat ring apart from the valve body creates additional parts and results in a process that has additional manufacturing and assembly steps, which is undesirable.

In a first embodiment of the high pressure post valve described herein, there is disclosed a method of manufacturing a post valve so that the seat ring is integrally formed thereon. The seat ring is integrally formed on the bottom side of the valve body with the gas cylinder-connecting threaded extension extending therefrom. This manufacturing procedure results in a post valve that provides no opportunity for gas to escape between the seat ring and the valve body. The unitary valve body described herein eliminates the need to manufacture a separate part; eliminates the need for a second "O" ring seal; and eliminates the need to press-fit the separate sealing ring onto the valve body. The manufacturing process includes starting with round metal bar stock, which is less expensive than the square or rectangular bar stock now used to machine the valve bodies, and cutting or etching away the outer diameter of the round metal stock to create the square or rectangular portions of the valve body The seat ring is turned or left to be circular. The threaded extension also is turned to the proper diameter. Thereafter, exterior holes (such as the outlet orifice) are created by side cuts or drill cuts. Next, the interior sections of the valve body are machined and the threads are cut into the threaded extension. Because this manufacturing process starts with the less expensive round bar stock, the entire manufacturing process is cheaper than the traditional process which starts with square or rectangular bar stock and uses a separate, press fitted or floating circular seat ring.

Another serious disadvantage of extant post valves for connection to a high pressure gas supply is that sometimes when the valve is opened, high pressure gas carries solid particulate materials into a valve cavity of the valve actuator (such as metal particles or dust from the gas cylinder). These high speed particles strike against the polymeric valve seat sealing material, thereby creating sufficient heat to ignite the valve seat material. This is potentially very dangerous to a patient receiving oxygen, and to those surrounding the high pressure gas cylinder.

Typical in the prior art, the actuator is coupled to a valve seat, typically made of brass, disposed in a valve chamber. Longitudinal movement of the actuator causes the valve seat to move toward or away from a conical gas inlet orifice. When the valve seat is moved away from the gas inlet orifice, gas under high pressure enters into the valve chamber through a passageway within the threaded extension and through the gas inlet orifice. The actuator valve seat includes a circular cavity. Valve seating material, typically a polymer or elastomeric material, is disposed within the cavity and, when the post valve is closed, comes into sealing contact with the conical gas inlet orifice to prevent gas from entering into the valve chamber. The polymer or elastomeric material is used at the seating surface of the orifice because it is softer than brass and thus provides a better seal. However, when the actuator is turned to cause the valve seat to move away from the orifice, gas under very high pressure flows through the orifice and comes into direct contact with the valve seat material 42. Impurities in the gas, such as particles, will hit the valve seat material directly at very high speeds. In some cases, the energy in these particles is enough to cause ignition of the valve seat material, which may lead to the combustion of the post valve and down stream components.

As disclosed herein in the second embodiment, the improved valve design includes the valve seat material 50 disposed to surround the gas inlet orifice. In this configuration, the bottom surface of the annular ring comprising the actuator valve seat provides sealing contact with the valve seat material in an area surrounding, and preferably below, the inlet orifice so that impurities within the gas flowing at high speeds through the orifice first hit a metal surface in the valve cavity, which has a much higher ignition temperature than the valve seat material. This configuration reduces the likelihood of impurities within the gas causing ignition with the post valve.

SUMMARY

In brief, the high pressure post valve disclosed here, in the first embodiment, provides a tight seal to a high pressure gas cylinder by including an integral gas cylinder sealing ring in a monolithic valve body formed from circular bar stock. In a second embodiment, the high pressure post valve includes a valve actuator having an annular valve seat, surrounding a valve cavity, and having a deformable valve seat material disposed in position to surround a gas inlet orifice for sealing contact with the annular actuator valve seat for sealing in an area surrounding the gas inlet orifice to prevent direct contact of high pressure inlet gas against the valve seat material.

Accordingly, one aspect of the apparatus and methods of a first embodiment disclosed herein is to provide a high pressure post valve, and a method of manufacturing the high pressure post valve, that includes a monolithic valve body formed from round metal bar stock, to form an integral, round valve body seat extending radially outwardly from the valve body for seating against gas cylinder structure with less gas leakage.

Another aspect of the apparatus and methods of a second embodiment disclosed herein is to provide a high pressure post valve having an annular valve seat and valve seat material surrounding, and preferably disposed below the valve inlet orifice to prevent any direct contact of high pressure gas directly against the valve seat material.

Still another aspect of the apparatus and methods disclosed herein is to provide a high pressure post valve having a filter material disposed within a gas flow conduit for removing any solid contaminants contained in the high pressure gas flowing through the post valve.

The above and other aspects and advantages of the post valves and methods of manufacturing the post valves described herein will become more apparent from the following detailed description, taken in conjunction with the drawings, wherein.

DETAILED DESCRIPTION

In the first embodiment of the high pressure post valve described herein, there is disclosed a method of manufacturing a post valve so that the seat ring is integrally formed thereon. The seat ring is integrally formed on a lower end of the valve body with a gas cylinder-connecting threaded extension extending therefrom. This manufacturing procedure results in a post valve that provides no opportunity for gas to escape between the seat ring and the valve body. The manufacturing process includes starting with round metal bar stock, which is less expensive than the square or rectangular bar stock now used to machine the valve bodies, and cutting or etching away the outer diameter of the round metal bar stock to create square or rectangular portions of the valve body. The seat ring is turned or left to be circular. The threaded extension also is turned to the proper diameter. Thereafter, exterior holes (such as the outlet orifice) are created by side cuts or drill cuts. Next, the interior sections of the valve body are machined and the threads are cut into the threaded extension. Because this manufacturing process starts with less expensive round bar stock, the entire manufacturing process is cheaper than the traditional process which starts with square or rectangular bar stock and uses a separate, press fitted or floating circular seat ring.

Figure 1:
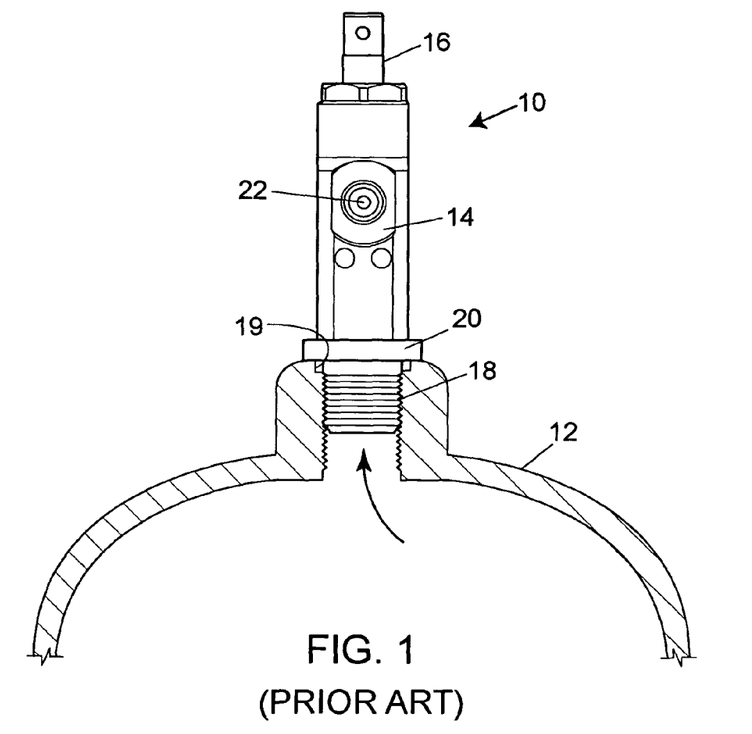
FIG. 1 is a side view of a prior art post valve connected to a high pressure gas cylinder.

As shown in FIG. 1, post valves 10 are threadedly connected to a high pressure gas cylinder 12. Known post valves 10 (FIGS. 1 and 2) include a valve body 14, a valve actuator 16 and a threaded extension 18 that is threadedly connected to port 19 of the gas cylinder 12. A seat ring 20 is disposed between the valve body 14 and the gas cylinder 12 and either one or two O-rings 21 are placed on one or both sides of the seat ring 20 in prior art post valves, as shown in FIG. 2, to limit gas escaping from the gas cylinder 12 between the threaded extension 18 and the gas cylinder 12.

During operation, the valve actuator 16 is turned, using a handle, knob or other turning mechanism (not shown) connected thereto, to open a valve orifice within the valve body 14 to thereby allow gas to enter through a passageway within the threaded extension 18 (as illustrated by the arrow in FIG. 1) and to escape out of an outlet orifice 22. The outlet orifice 22 is fluidly connectable to a device that uses the gas within the tank 12, such as a torch or a breathing apparatus (not shown).

Figure 2:
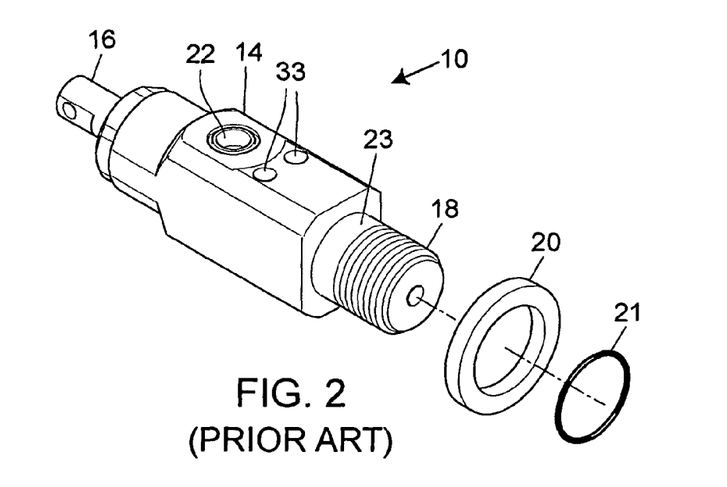
FIG. 2 is a perspective, partially exploded view, of the prior art post valve of FIG. 1, showing a separate valve body seat ring.

FIG. 2 illustrates a prior art post valve 10 after the valve actuator 16 has been assembled onto the valve body 14, but before the seat ring 20 is press-fitted thereon. As illustrated, the seat ring 20 is created or machined as a separate part and is placed over a collar 23 on the threaded extension 18 before the post valve 10 is attached to a gas cylinder. In the past, O-rings have been placed on both sides of the seat ring 20, or as illustrated in FIG. 2, the seat ring 20 has been press fitted onto the collar 23 of the threaded extension 18 without an O-ring between the seat ring 20 and the valve body 14. In either case, there is some opportunity for gas within the gas cylinder 12 to escape through the threaded engagement of the extension 18 and the inner diameter of the seat ring 20 in the prior art valve shown in FIG. 2. Further, the manufacturing of the seat ring 20 apart from the valve body 14 creates additional parts and results in a process that has additional manufacturing and assembly steps, which is undesirable.

Figure 3:
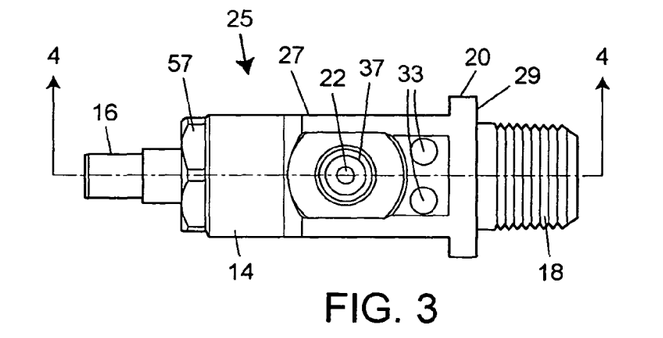
FIG. 3 is a side view of the post valve described herein.

In accordance with the first embodiment of the post valve described herein, the seat ring 20 is integrally formed as a unitary part of the valve body 14. The new post valve 25 is illustrated in FIG. 3 where it can be seen that the valve body seat ring 20 is integrally formed on a lower end of the valve body 14 above the threaded extension 18, extending downwardly therefrom. This manufacturing procedure results in a post valve 25 that provides no opportunity for gas to escape between the seat ring 20 and the valve body 14. The manufacturing process includes starting with round metal bar stock, which is less expensive than the square bar stock now used to machine the valve bodies 14 of FIGS. 1 and 2, and cutting or etching away each of the sections thereon to create a predominantly square or rectangular cross-sectional shape to the valve body 14. The seat ring 20 is turned for constant diameter or left to be circular. Generally, if turning or other metal removal process is needed to provide a constant diameter to the seat ring 20, less than 10% of the material of the seat ring 20 is removed, preferably less than about 5% of the seat ring material. The threaded extension 18 is also turned to the proper diameter. Thereafter, the exterior holes (such as the outlet orifice 22) are created by side cuts or drill cuts. Next, the interior sections of the valve body 14 are machined and the threads are cut into the threaded extension 18. Because this manufacturing process starts with less expensive round bar stock, the entire manufacturing process is cheaper than the traditional process which starts with square or rectangular bar stock and uses a separate circular seat ring 20.

Figure 4:
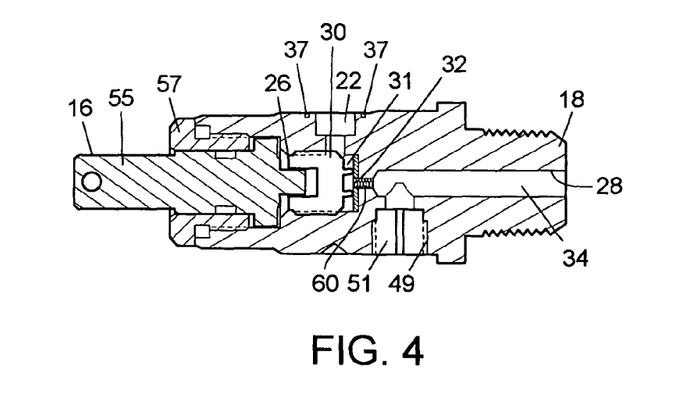
FIG. 4 is a cross-sectional view of the post valve of FIG. 3, taken along the line 4—4 of FIG. 3.

Accordingly, the high pressure post valve 25 of the first embodiment described herein comprises a monolithic valve body 14 having an internal aperture 26 for receiving the valve actuator 16 for internal connection and seating within the valve body 14. The valve body 14 has an integral threaded extension 18 for threadedly connecting the valve body 14 to the gas cylinder 12, and the threaded extension 18 includes a gas inlet orifice 32 in alignment with the internal aperture 26 for the passage of high pressure inlet gas to the valve actuator 16. The valve body 14 includes an integral, circular valve body seat 20 including a lower, planar valve body seating surface 29 disposed above and extending radially outwardly from the threaded extension for seating the valve body 14 against the gas cylinder outlet opening 19. In accordance with a preferred embodiment, the valve body 14 is formed from round metal bar stock.

The post valve 25 is manufactured by forming metal round bar stock (not shown) to provide a monolithic valve body 14 including the internal aperture 26 for receiving the valve actuator 16. The valve body 14 has predominantly planar side surfaces 27 and an integral circular threaded extension 18 for connection to the high pressure gas cylinder 12. The valve body 14 includes an integral, circular valve body seat 20 extending radially outwardly from the valve body 14 between the threaded extension 18 and the planar side surfaces 27 for seating the valve body 14 against gas cylinder 12 structure surrounding the gas cylinder outlet opening 19. The threaded extension 18 includes a gas inlet orifice 32 in alignment with the internal aperture 26 in which the actuator 16 is connected within the valve body 14 for the passage of inlet gas to the value actuator 16.

The fabrication method becomes much simpler when starting with metal round stock, as described hereinafter.

The round metal stock is continuously fed by an automatic bar feeder. First or chuck side process: The front end work is very similar to conventional machining: center drilling, turning, boring, thread milling, side cut drilling and tapping. The valve is then oriented by the machine and a flat is milled on the first side (⅞" side). The valve is indexed 90° and another flat is milled along with side-work (center drilling, side cut drilling and tapping). The valve is indexed 90° and another flat is milled on the third side (⅞" side). The valve is indexed 90° and the final flat is milled a long with side-work (center drilling, side cut drilling and forming). A secondary spindle (sub-spindle) then grasps the valve, both a primary spindle (chuck) and the secondary spindle rotate in synchronization and the part is cut to length as the sub-spindle pulls away from the primary spindle (chuck). Simultaneously the part in the sub-spindle and the part in the chuck start to be machined. Second or sub-spindle side process: The back end work is very similar to conventional machining; center drilling, turning, thread milling and side cut drilling. The machined complete part is then transferred into a parts catcher.

In accordance with the second embodiment of the post valves described herein, the post valve 25 provides an improvement to the valve seating arrangement used inside the valve body 14 of the post valve 25. FIG. 4 illustrates a cross-sectional view longitudinally through the post valve 25 of FIG. 3. As is typical in the art, the actuator 16 is coupled to a valve seat 30, typically made of brass, disposed in a valve chamber 31. Movement of the actuator 16 (e.g., turning of the actuator 16) causes the valve seat 30 to move toward or away from a conical gas inlet orifice 32. When the valve seat 30 is moved away from the gas inlet orifice 32, gas under high pressure enters into the valve chamber 31 through a passageway 34 within the threaded extension 18 and through the gas inlet orifice 32.

Figure 5:
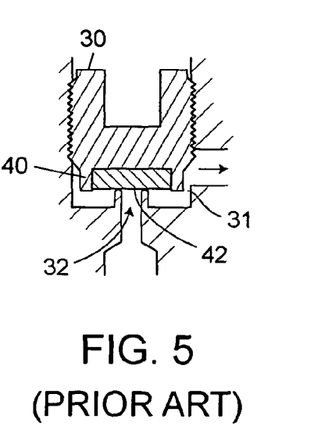
FIG. 5 is a partial, cross-sectional view of a valve seat portion of the prior art post valve of FIG. 1.
Figure 6:
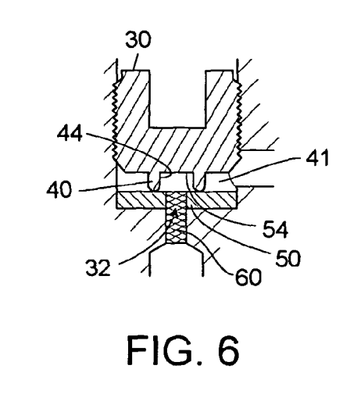
FIG. 6 is a partial, cross-sectional view of the valve seat portion of the post valve of FIG. 4.

FIG. 5 illustrates a known valve seat mechanism 30 while FIGS. 4 and 6 illustrate the improved design of the second embodiment described herein. As shown in FIG. 5, the prior art valve seat 30 includes an annular ring 40 which forms a circular cavity within the valve seat 30. Valve seating material 42, typically a polymer or elastomer, is disposed within the cavity and, when the post valve is closed, comes into sealing contact with the conical gas inlet orifice 32 to prevent gas from entering into the chamber 31. This prior art design is prone to spontaneous ignition or auto-ignition of the valve seat material 42 during operation. In particular, when the actuator is turned to cause the valve seat 30 to move away from the orifice 32, gas under very high pressure flows through the orifice 32 and comes into direct contact with the valve seat material 42. Impurities in the gas, such as solid particles, will hit the valve seat material 42 directly at very high speeds. In some cases, the energy in these particles in enough to cause spontaneous ignition of the valve seat material 42, which may lead to the melting of the post valve and result in a substantial fire hazard.

The improved valve design 25, described herein, includes a polymeric or elastomeric sealing material 50 disposed to surround the gas inlet orifice 32. In this configuration, the bottom surface of the annular ring 40 provides sealing contact with the sealing material 50 in a closed loop surrounding and preferably below the gas inlet orifice 32. Furthermore, a valve cavity 41, defined by the annular ring 40 and an upper, interior valve seat surface 54, does not have any ignitable, elastomeric material therein so that the interior valve seat surface 54 of the valve seat body 30, subject to direct contact with high pressure gas by virtue of being in longitudinal alignment with the gas inlet orifice 32, is formed of metal and not subject to ignition. In the configuration of FIG. 6, impurities within the gas flowing at high speeds through the orifice 32 first hit the metal surface 54 of the valve chamber, which, in the preferred embodiment, is made of brass having a much higher melting temperature than the valve seat material 50. This configuration reduces the likelihood of impurities within the gas causing auto ignition within the post valve, since there is no direct contact of high pressure gas with the sealing material 50 (the sealing material 50 is not in longitudinal alignment with an upward extension of the cross-sectional area of the gas inlet orifice 32).

As best shown in FIGS. 3 and 4, the valve body 14 includes external apertures 33 that act as locating devices for alignment of a gas regulator device (not shown) that attaches to valve 25. The separation distance between apertures 33 is defined by Compressed Gas Association (CGA) industry standards. Adjacent to apertures 33 is the gas outlet passage 22. Surrounding the outlet passage 22 is a circular groove 37 useful in receiving and locating a seal device that is a part of gas regulators well known in the medical gas industry and constructed according to CGA standards. Outlet passage 22 is located in accordance with the position of apertures 33, also in accordance with CGA standards.

The valve actuator 16 includes a rotatable stem 55 that is held within the internal aperture 26 with an externally threaded bonnet 57 that mates with internal threads within an interior surface of the valve body 14. Actuator stem 55 is operatively positioned with respect to the actuator valve seat body 30, having the annular ring seat 40 extending therefrom, for sealing contact against the valve seat material 50. Rotation of the actuator stem upwardly or downwardly enables or restricts gas flow, respectively, from the valve inlet orifice 32 to the outlet passage 22. Disposed within threaded aperture 49 in an exterior wall of the valve body 14 is a threaded plug 51 that secures an over-pressure rupture disk.

Accordingly, the high pressure post valve 25 of the second embodiment comprises the valve body 14 having an internal aperture 26 for receiving a valve actuator 16 for internal connection and seating within the valve body 14, wherein the valve body 14 has a threaded extension 18 for threadedly connecting the valve body 14 to the gas cylinder 12, the threaded extension including a gas inlet orifice 32 in alignment with the internal aperture 26 for the passage of high pressure inlet gas to the valve actuator 16.

The valve actuator includes an annular valve seat 40 surrounding a valve cavity 41, the valve seat 40 being disposed at a lower end of the value actuator 16 and longitudinally movable within the internal aperture 26 in the valve body 14 by manipulation of the valve actuator 16 to open and close the valve inlet orifice 32.

The valve body 14 also includes valve seat material 50 adjacent to, surrounding, and preferably below the gas inlet orifice 32 such that longitudinal movement of the annular valve seat 40 in sealing contact with the valve seat material 50 to close the valve provides sealing of the valve cavity 41 in an area surrounding, and preferably below the gas inlet orifice 32, and such that longitudinal movement of the valve seat 40 to open the valve 25 prevents any direct contact of high pressure inlet gas against the valve seat material 50.

The high pressure post valve 25 of this second embodiment is manufactured by forming a valve body 14 to include an internal aperture 26 for receiving the valve actuator 16 and a threaded extension 18 for connection to the high pressure gas cylinder 12, wherein the threaded extension 18 includes a gas inlet orifice 32 in alignment with said internal aperture 26 for the passage of inlet gas to the valve actuator 16.

The valve actuator then is connected to said valve body 14, within the internal aperture 26, e.g., by threaded attachment. The valve actuator 16 includes an annular valve seat 40 surrounding a valve cavity 41, said valve seat 40 disposed at a lower end of the valve actuator 16. The valve seat 40 is longitudinally movable within the internal aperture 26 in the valve body 14 by manipulation of the valve actuator 16 to open and close the valve inlet orifice 32.

The valve body 14 also includes valve seat material 50 adjacent to, surrounding, and preferably below the gas inlet orifice 32 such that longitudinal movement of the annular valve seat 40 in sealing contact with the valve seat material 50 to close said valve 25 provides sealing of the valve chamber 41 in an area surrounding the gas inlet orifice 32, and longitudinal movement of the valve seat 40 to open the valve 25 prevents any direct contact of high pressure inlet gas against the valve seat material 50.

In accordance with a third embodiment, the high pressure post valve includes a filter, such as a sintered bronze filter 60, disposed within the gas inlet orifice 32 (instead of or in addition to the annular valve seat surrounding the gas inlet orifice 32) to trap any solid contaminants. The filter can be press-fitted into the gas inlet orifice 32 within the threaded extension 18 to prevent any solids from contacting valve seat material disposed in alignment with the gas inlet orifice 32, thereby avoiding combustion. When the filter 60 is disposed in the gas inlet orifice 32, e.g., by press-fitting or by threaded connection (not shown), the valve actuator 16 can contain valve seat material within the valve cavity 41 (as in prior art post valves) since the filter will remove the problematic solid contaminants.

The invention claimed is:

1. A high pressure post valve removably attachable to a high pressure gas cylinder having a gas outlet opening, said valve comprising:
a monolithic valve body manufactured by forming metal round bar stock to have predominantly planar side surfaces and having an internal aperture for receiving a valve actuator for internal connection and seating within the valve body, said valve body having an integral threaded extension for threadedly connecting the valve body to the gas cylinder, said threaded extension including a gas inlet orifice in alignment with the internal aperture for the passage of high pressure inlet gas to the valve actuator, and said valve body including an integral, circular valve body seat including a planar valve body seating surface disposed above and extending radially outwardly from the threaded extension for seating the valve body against the gas cylinder outlet opening, said valve body formed from circular metal bar stock.

2. A high pressure post valve in accordance with claim 1, wherein the gas inlet orifice is in longitudinal alignment with the internal aperture in the valve body, and wherein the valve body includes a gas outlet orifice disposed at a right angle to said gas inlet orifice and said internal aperture in the valve body.

3. A high pressure post valve in accordance with claim 1, wherein the valve actuator is threadedly connected to the valve body within the internal aperture in the valve body.

4. A high pressure post valve in accordance with claim 1, wherein the valve body is formed from circular metal bar stock material that is not reduced in diameter or is reduced in diameter to remove about 10% by weight or less material to form the circular valve body.

5. A high pressure post valve in accordance with claim 1, wherein the valve seat includes exterior threads adjacent to mating threads cut in an adjacent surface of the valve body so that rotational movement of the valve seat raises or lowers the valve seat with respect to the valve seat material.

6. A high pressure post valve removably attachable to a high pressure gas cylinder having a gas outlet opening, said valve comprising:
a monolithic valve body manufactured by forming metal round bar stock to have predominantly planar side surfaces and having an internal aperture for receiving a valve actuator for internal connection and seating within the valve body, said valve body having an integral threaded extension for threadedly connecting the valve body to the gas cylinder, said threaded extension including a gas inlet orifice in alignment with the internal aperture for the passage of high pressure inlet gas to the valve actuator, and said valve body including an integral, circular valve body seat including a planar valve body seating surface disposed above and extending radially outwardly from the threaded extension for seating the valve body against the gas cylinder outlet opening, wherein the valve actuator includes an annular valve seat for seating against a valve seat material such that seating of the actuator valve seat against the valve seat material prevents the flow of gas through the valve.

7. A high pressure post valve in accordance with claim 6, wherein the valve seat material is composed of a polymer or elastomer.

8. A high pressure post valve in accordance with claim 6, wherein all of the valve seat material is disposed below the gas inlet orifice.

9. A high pressure post valve in accordance with claim 6 further including a filter disposed within the gas inlet orifice for removing solid particles from the high pressure gas entering the gas inlet orifice.

10. A high pressure post valve in accordance with claim 9, wherein the filter disposed within the gas inlet orifice is in longitudinal alignment with the internal aperture in the valve body, and wherein the valve body includes a gas outlet orifice disposed at a right angle to said gas inlet orifice and said internal aperture in the valve body.

11. A high pressure post valve in accordance with claim 10, wherein the filter is a sintered metal filter that permits gas to pass therethrough and retains solids.

12. A high pressure post valve in accordance with claim 11, wherein the filter is sintered metal.

13. A high pressure post valve in accordance with claim 12, wherein the filter is sintered bronze.

14. A high pressure post valve removably attachable to a high pressure gas cylinder having a gas outlet opening, said valve comprising:
a valve body having an internal aperture for receiving a valve actuator for internal connection and seating within the valve body, said valve body having an integral threaded extension for threadedly connecting the valve body to the gas cylinder, said threaded extension including a gas inlet orifice in alignment with the internal aperture for the passage of high pressure inlet gas to the valve actuator, and said valve body including an integral, circular valve body seat including a planar valve body seating surface disposed above and extending radially outwardly from the threaded extension for seating the valve body against the gas cylinder outlet opening,
wherein the valve actuator includes an annular brass valve seat for seating against a valve seat material such that seating of the actuator valve seat against the valve seat material prevents the flow of gas through the valve.

15. A method of forming a high pressure post valve including a monolithic valve body and a valve actuator for internal connection and seating within the valve body comprising:
forming metal circular bar stock to provide a monolithic valve body including an internal opening for receiving the valve actuator, and having predominantly planar side surfaces, and a circular threaded extension for connection to a high pressure gas cylinder, said valve body including an integral, circular valve body seat extruding radially outwardly from the valve body between the threaded extension and the planar side surfaces for seating the valve body against gas cylinder structure surrounding the gas cylinder outlet opening, said threaded extension including a gas inlet orifice in alignment with said internal aperture for the passage of inlet gas to the valve actuator.

16. A method in accordance with claim 15, wherein the gas inlet orifice is in longitudinal alignment with the internal aperture in the valve body, and wherein the valve body includes a gas outlet orifice disposed at a right angle to said gas inlet orifice and said internal aperture in the valve body.

17. A method in accordance with claim 15, wherein the valve actuator is threadedly connected to the valve body within the internal aperture in the valve body.

18. A method in accordance with claim 15, wherein the circular metal bar stock material that comprises the valve body seat is not reduced in diameter or is reduced in diameter to remove about 10% by weight or less material to form the circular valve body seat.

19. A method in accordance with claim 15, wherein the valve seat includes exterior threads adjacent to mating threads cut in an adjacent surface of the valve body so that rotational movement of the valve seat raises or lowers the valve seat with respect to the valve seat material.

20. A method of forming a high pressure post valve including a valve body and a valve actuator for internal connection and seating within the valve body comprising:
forming a valve body including an internal opening for receiving the valve actuator, and having predominantly planar side surfaces, and a circular threaded extension for connection to a high pressure gas cylinder, said valve body including an integral, circular valve body seat extruding radially outwardly from the valve body between the threaded extension and the planar side surfaces for seating the valve body against gas cylinder structure surrounding the gas cylinder outlet opening, said threaded extension including a gas inlet orifice in alignment with said internal aperture for the passage of inlet gas to the valve actuator, wherein the valve actuator includes an annular valve seat for seating against a valve seat material such that seating of the actuator valve seat against the valve seat material prevents the flow of gas through the valve.

21. A method in accordance with claim 20, wherein the valve seat material comprises a polymer or elastomer.

22. A method in accordance with claim 20, wherein the actuator valve seat comprises brass.

23. A method in accordance with claim 20, wherein all of the valve seat material is disposed below the gas inlet orifice.

24. A high pressure post valve removably attachable to a high pressure gas cylinder having a gas outlet opening; said valve comprising:
a monolithic valve body manufactured by forming metal round bar stock to have predominantly planar side surfaces and having an internal aperture for receiving a valve actuator for internal connection and seating within the valve body, said valve body having an integral threaded extension for threadedly connecting the valve body to the gas cylinder, said threaded extension including a gas inlet orifice in alignment with the internal aperture for the passage of high pressure inlet gas to the valve actuator, and said valve body including an integral, circular valve body seat including a planar valve body seating surface disposed above and extending radially outwardly from the threaded extension for seating the valve body against the gas cylinder outlet opening, said valve actuator including an annular valve seat that seats against a valve seat material that is disposed below said gas inlet orifice.

25. A high pressure post valve in accordance with claim 24, wherein the gas inlet orifice is in longitudinal alignment with the internal aperture in the valve body, and wherein the valve body includes a gas outlet orifice disposed at a right angle to said gas inlet orifice and said internal aperture in the valve body.

26. A high pressure post valve in accordance with claim 24, wherein the valve actuator is threadedly connected to the valve body within the internal aperture in the valve body.

27. A high pressure post valve in accordance with claim 24, the valve seat seats against valve seat material, and wherein all of the valve seat material is disposed below the gas inlet orifice.

28. A high pressure post valve removably attachable to a high pressure gas cylinder having a gas outlet opening, said valve comprising:
a monolithic valve body manufactured by forming metal round bar stock to have predominantly planar side surfaces and having an internal aperture for receiving a valve actuator threadedly connected to the valve body within the internal actuator for internal connection and seating within the valve body, said valve body having an integral threaded extension for threadedly connecting the valve body to the gas cylinder, said threaded extension including a gas inlet orifice in alignment with the internal aperture for the passage of high pressure inlet gas to the valve actuator, and said valve body including an integral, circular valve body seat including a planar valve body seating surface disposed above and extending radially outwardly from the threaded extension for seating the valve body against the gas cylinder outlet opening, said valve actuator including an annular valve seat that seats against a valve seat material that is disposed below said gas inlet orifice.

29. A high pressure post valve removably attachable to a high pressure gas cylinder having a gas outlet opening, said valve comprising:
a monolithic valve body manufactured by forming metal round bar stock to have predominantly planar side surfaces and having an internal aperture for receiving a valve actuator for internal connection and seating within the valve body, said valve body having an integral threaded extension for threadedly connecting the valve body to the gas cylinder, said threaded extension including a gas inlet orifice in alignment with the internal aperture for the passage of high pressure inlet gas to the valve actuator, and said valve body including an integral, circular valve body seat including a planar valve body seating surface disposed above and extending radially outwardly from the threaded extension for seating the valve body against the gas cylinder outlet opening, said valve actuator including an annular valve seat that seats against a valve seat material that is disposed below said gas inlet orifice, wherein all of the valve seat material is disposed below the gas inlet orifice.

* * * * *

UNITED STATES PATENT AND TRADEMARK OFFICE
CERTIFICATE OF CORRECTION

PATENT NO. : 6,997,348 B2  Page 1 of 1
APPLICATION NO. : 10/612634
DATED : February 14, 2006
INVENTOR(S) : J. Patrick Droppleman It is certified that error appears in the above-identified patent and that said Letters Patent is hereby corrected as shown below:

On Title Page, Item (57)

Abstract, Line 17, "of high" should be -- the high --.

Column 10, Line 43, "opening;" should be -- opening, --.

Signed and Sealed this

Sixth Day of March, 2007

JON W. DUDAS
*Director of the United States Patent and Trademark Office*